(12) United States Patent
Wareham et al.

(10) Patent No.: US 12,275,490 B2
(45) Date of Patent: Apr. 15, 2025

(54) BICYCLE CONTROL SYSTEM

(71) Applicant: SRAM, LLC, Chicago, IL (US)

(72) Inventors: Anneliese Wareham, Chicago, IL (US);
Rachel Cahan, Chicago, IL (US);
Thomas Kehrer, Chicago, IL (US)

(73) Assignee: SRAM, LLC, Chicago, IL (US)

(*) Notice: Subject to any disclaimer, the term of this patent is extended or adjusted under 35 U.S.C. 154(b) by 0 days.

(21) Appl. No.: 18/173,918

(22) Filed: Feb. 24, 2023

(65) Prior Publication Data

US 2024/0286709 A1 Aug. 29, 2024

(51) Int. Cl.
*B62M 25/08* (2006.01)
*B62K 23/06* (2006.01)
*B62L 3/02* (2006.01)
*B62M 25/04* (2006.01)

(52) U.S. Cl.
CPC ............. *B62M 25/08* (2013.01); *B62K 23/06* (2013.01); *B62L 3/023* (2013.01); *B62M 25/04* (2013.01)

(58) Field of Classification Search
CPC ....... B62M 25/08; B62M 25/04; B62K 23/06; B62L 3/023
See application file for complete search history.

(56) References Cited

U.S. PATENT DOCUMENTS

| | | | |
|---|---|---|---|
| 10,988,209 B1 | 4/2021 | Luman et al. | |
| 2017/0305491 A1* | 10/2017 | Komatsu | B62L 3/023 |
| 2017/0305492 A1* | 10/2017 | Komatsu | B62K 23/06 |
| 2019/0210691 A1* | 7/2019 | Cahan | B62L 3/023 |

FOREIGN PATENT DOCUMENTS

| | | |
|---|---|---|
| CN | 114435525 | 5/2022 |
| TW | 201930141 | 8/2019 |

OTHER PUBLICATIONS

Perfect Shifting Within Reach; Website: May 20, 2021; https://bike.shimano.com/en-US/information/news/perfect-shifting-with-reach-setting-adjustment-on-shimano-road-s.html; last checked Jul. 31, 2024.
Welcome Guide; Website: https://www.sram.com/en/learn/force-axs-welcome-guide/customize-your-controls; last checked Jul. 31, 2024.

* cited by examiner

*Primary Examiner* — Terence Boes

(57) ABSTRACT

A bicycle control system includes a housing, a brake lever moveably connected to the housing between an at-rest position and a brake engaging position, and a shift lever moveably connected to the brake lever between an at-rest position and a shift actuating position. An electrical switch is disposed on one of the brake lever or the shift lever. An adjustable shift actuator is moveably coupled to the other of the brake lever or the shift lever. The shift actuator is configured to actuate the electrical switch when the shift lever is moved to the shift actuating position. The shift actuator is adjustably moveable relative to the other of the brake lever or the shift lever so as to adjust the distance between the at-rest position and the shift actuating position.

21 Claims, 12 Drawing Sheets

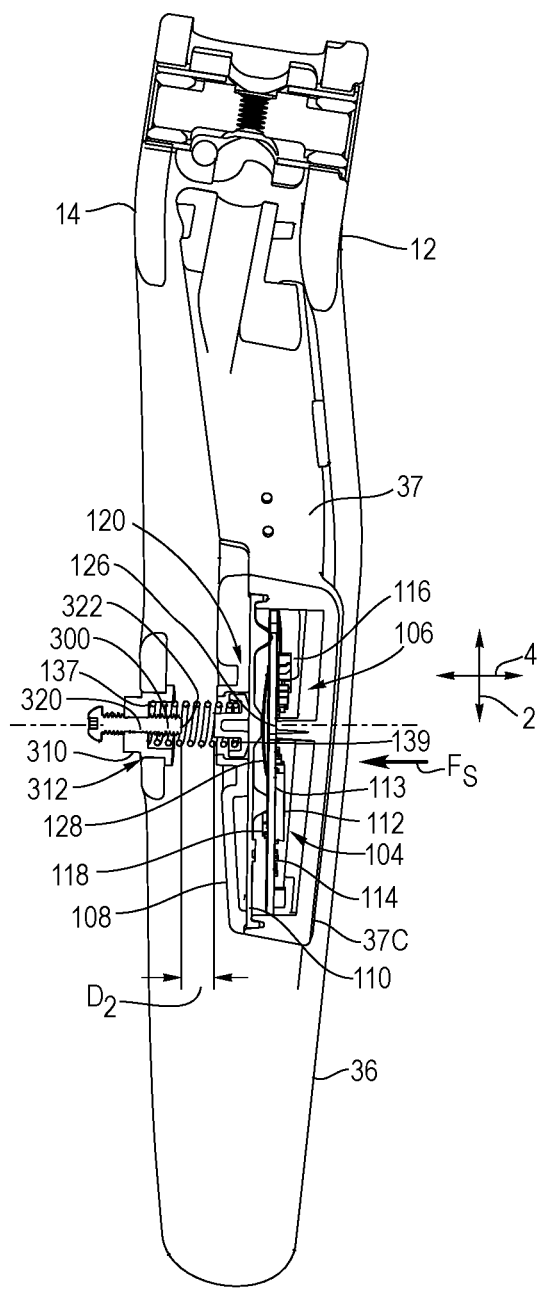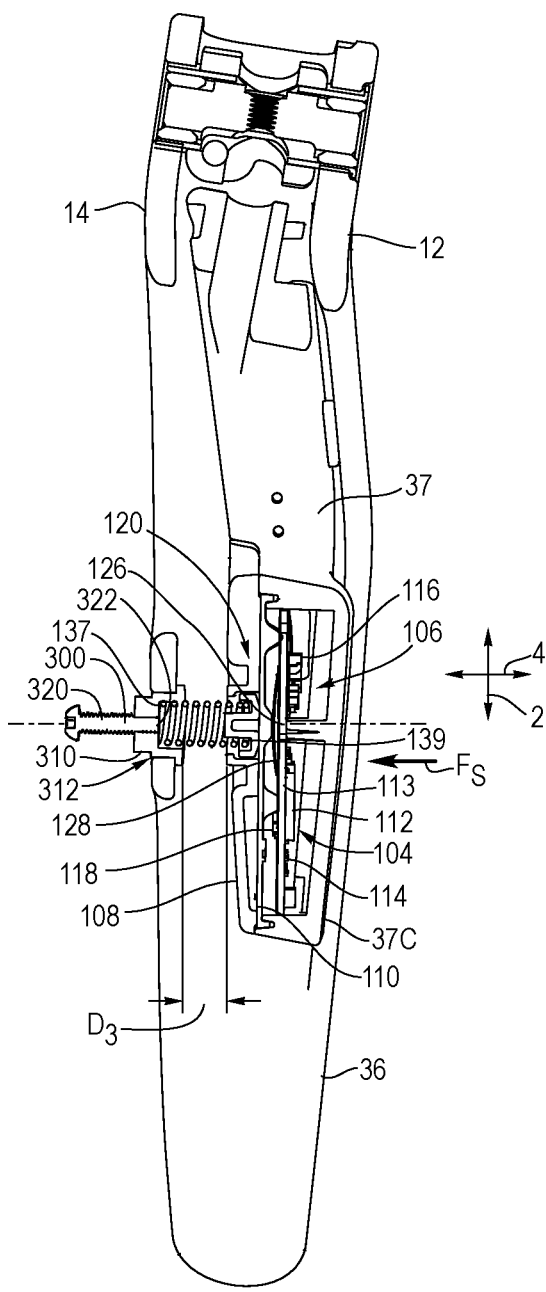

BICYCLE CONTROL SYSTEM

FIELD OF THE DISCLOSURE

The present application generally relates to a bicycle control system, including for example a shift lever.

BACKGROUND

Bicycles are known to have control systems for actuating various brake and gear changer systems. Typically, such control systems include one or more levers for initiating the actuation. For example, in some systems, a shift lever may be moved to initiate gear shifting. Typically, the displacement, or stroke length, of the shift lever required to actuate the gear changer system is not adjustable, meaning some riders may have trouble fully actuating the lever. In addition, such systems prevent the rider from optimizing the shift stroke most suitable for their particular riding style, for example by minimizing the amount of time to shift, which may be desired for example in competitive situations such as racing. Conversely, some riders may desire a longer shift stroke to avoid inadvertent shifting, for example during bumpy riding conditions.

SUMMARY

In one aspect, one embodiment of a bicycle control system includes a housing, a brake lever moveably connected to the housing, wherein the brake lever is moveable relative to the housing between an at-rest position and a brake engaging position, and a shift lever moveably connected to the brake lever, wherein the shift lever is moveable relative to the brake lever a distance between an at-rest position and a shift actuating position. An electrical switch is disposed on one of the brake lever or the shift lever. An adjustable shift actuator is moveably coupled to the other of the brake lever or the shift lever. The shift actuator is configured to actuate the electrical switch when the shift lever is moved to the shift actuating position. The shift actuator is adjustably moveable relative to the other of the brake lever or the shift lever so as to adjust the distance between the at-rest position and the shift actuating position.

In another aspect, one embodiment of a bicycle control system includes a housing component and a shift lever moveably connected to the housing component, wherein the shift lever is moveable relative to the housing component a distance between an at-rest position and a shift actuating position. The shift lever includes an electrical switch and a controller, wherein the controller is in communication with the electrical switch and is configured to generate a signal to change a shift position of a gear shifting device responsive to an input from the electrical switch. An adjustable shift actuator is moveably coupled to the housing component and is configured to actuate the electrical switch when the shift lever is moved to the shift actuating position. The shift actuator is adjustably moveable relative to the housing component so as to adjust the distance between the at-rest position and the shift actuating position. In exemplary embodiments, the housing component may include a fixed housing of the control system or the brake lever.

The foregoing paragraphs have been provided by way of general introduction, and are not intended to limit the scope of the claims presented below. The various preferred embodiments, together with further advantages, will be best understood by reference to the following detailed description taken in conjunction with the accompanying drawings.

BRIEF DESCRIPTION OF THE DRAWINGS

Objects, features, and advantages of the present invention will become apparent upon reading the following description in conjunction with the drawing figures, in which:

FIGS. 4A, 4B and 4C are cross-sectional cuts taken respectively along lines 4A-4A, 4B-4B and 4C-4C in FIG. 3, with a shift actuator shown respectively in a minimum shift stroke position, an intermediate shift stroke position and a maximum shift stroke position;

DETAILED DESCRIPTION OF THE DISCLOSURE

Figure 4A:
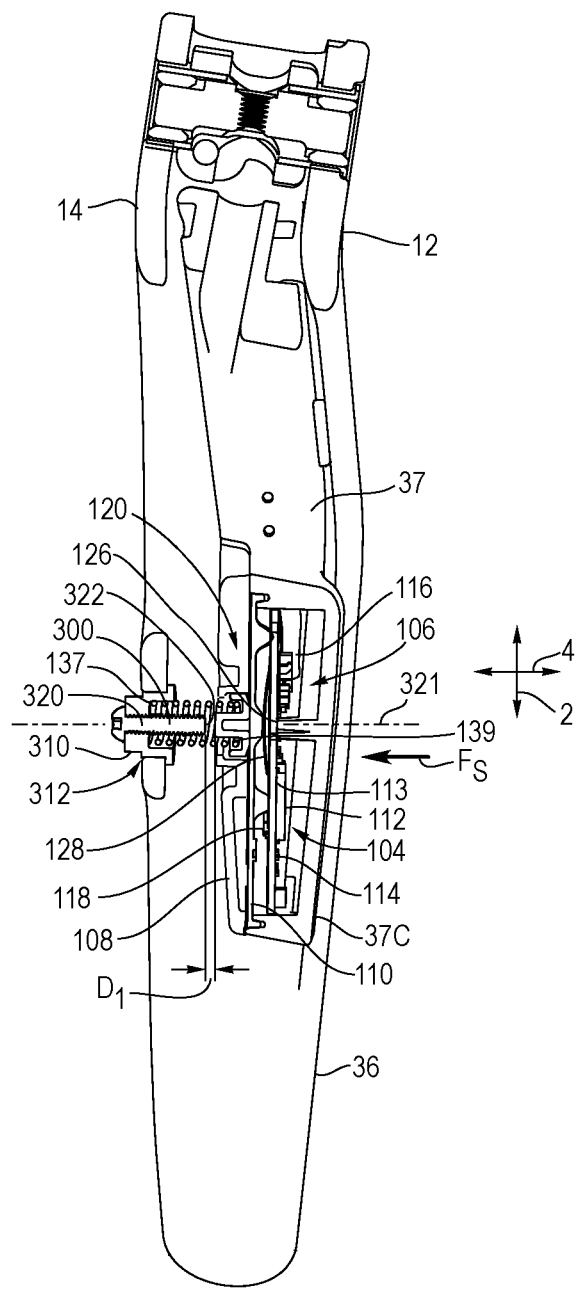
Figure 5:
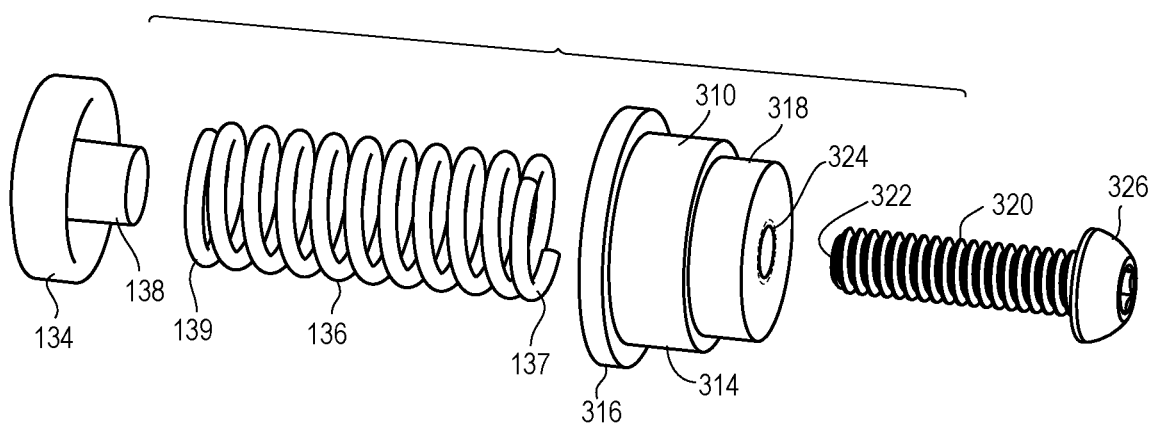
FIG. 5 is an exploded perspective view of one embodiment of the shift actuator.
Figure 6:
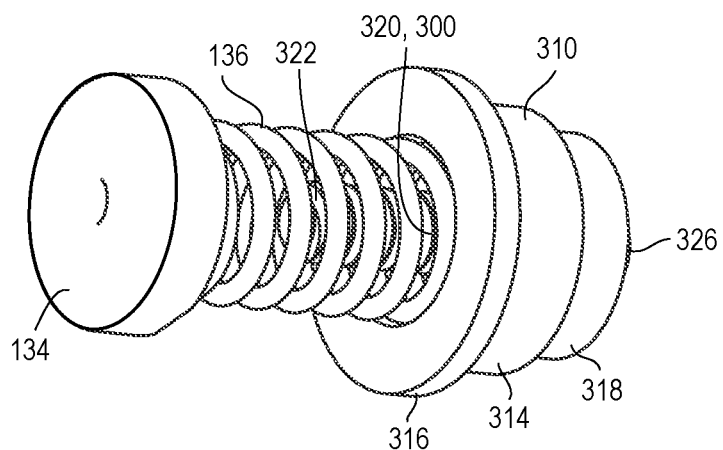
FIG. 6 is an assembled perspective view of one embodiment of a shift actuator shown in a maximum shift stroke position.
Figure 7:
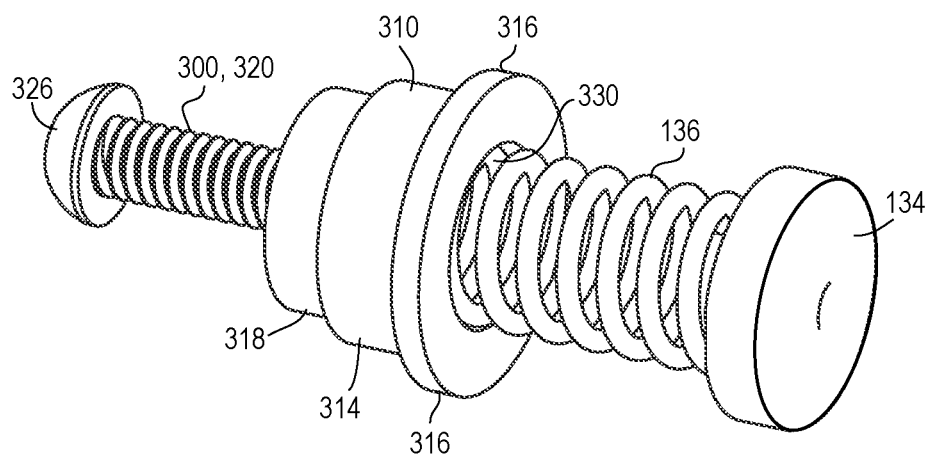
FIG. 7 is an assembled perspective view of one embodiment of the shift actuator shown in a minimum shift stroke position.
Figure 8:
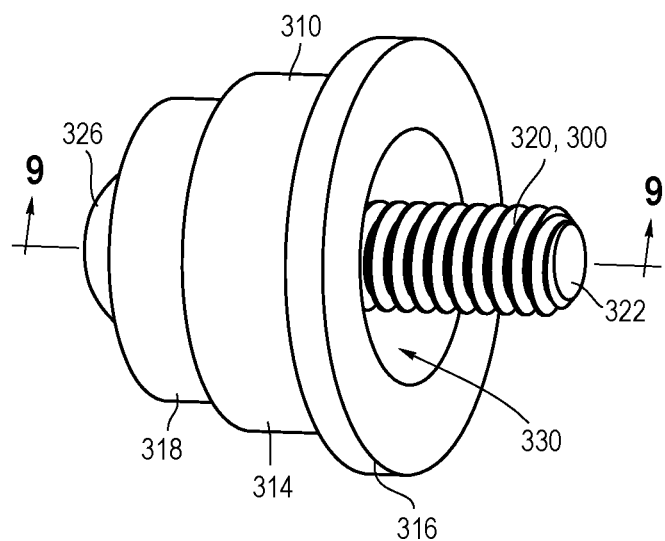
FIG. 8 is a perspective view of a portion of one embodiment of the shift actuator.
Figure 9:
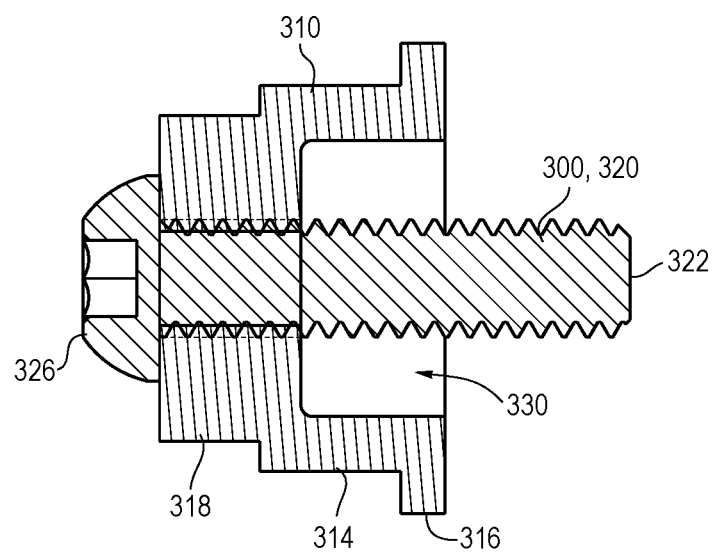
FIG. 9 is a cross-sectional view of the portion of one embodiment of the shift actuator shown in FIG. 8 take alone 9-9.

It should be understood that the term "plurality," as used herein, means two or more. The term "longitudinal," as used herein means of or relating to a length or lengthwise direction 2, for example a direction running along a length of a shift lever 37 as shown in FIG. 4A, but is not limited to a linear path. The term "lateral," as used herein, means situated on, directed toward or running in a side-to-side direction 4, as shown for example in FIG. 4A. The term "coupled" means connected to or engaged with, whether directly or indirectly, for example with an intervening member, and does not require the engagement to be fixed or permanent, although it may be fixed or permanent. The terms "first," "second," and so on, as used herein are not meant to be assigned to a particular component so designated, but rather are simply referring to such components in the numerical order as addressed, meaning that a component designated as "first" may later be a "second" such component, depending on the order in which it is referred. It should also be understood that designation of "first" and "second" does not necessarily mean that the two components or values so designated are different, meaning for example a first direction may be the same as a second direction, with each simply being applicable to different components. The terms "upper," "lower," "rear," "front," "fore," "aft," "vertical," "horizontal," "right," "left," "inboard," "outboard" and variations or derivatives thereof, refer to the orientations of an exemplary bicycle, shown in FIG. 1, from the perspective of a user seated thereon. For example, a rear portion 6 of a control assembly 30 corresponds to the mounting end thereof, while a front or forward portion 10 corresponds to the opposite portion or end longitudinally spaced therefrom. The outboard side 12 of the control assembly 30 corresponds to the side facing outwardly from the control assembly away from a centerline plane, while the inboard side 14 corresponds to the side facing inwardly toward the centerline as shown for example in FIG. 4A. The term "transverse" means non-parallel. More generally, the terms "outer" and "outwardly" refers to a direction or feature facing away from a centralized location, for example the phrases "radially outwardly," "radial direction" and/or derivatives thereof, refer to a feature diverging away from a centralized location. Conversely, the terms "inward" and "inwardly" refers to a direction facing toward the centralized or interior location. The term "subassembly" refers to an assembly of a plurality of components, with subassemblies capable of being further assembled into other subassemblies and/or a final assembly, such as the bicycle.

Figure 1:
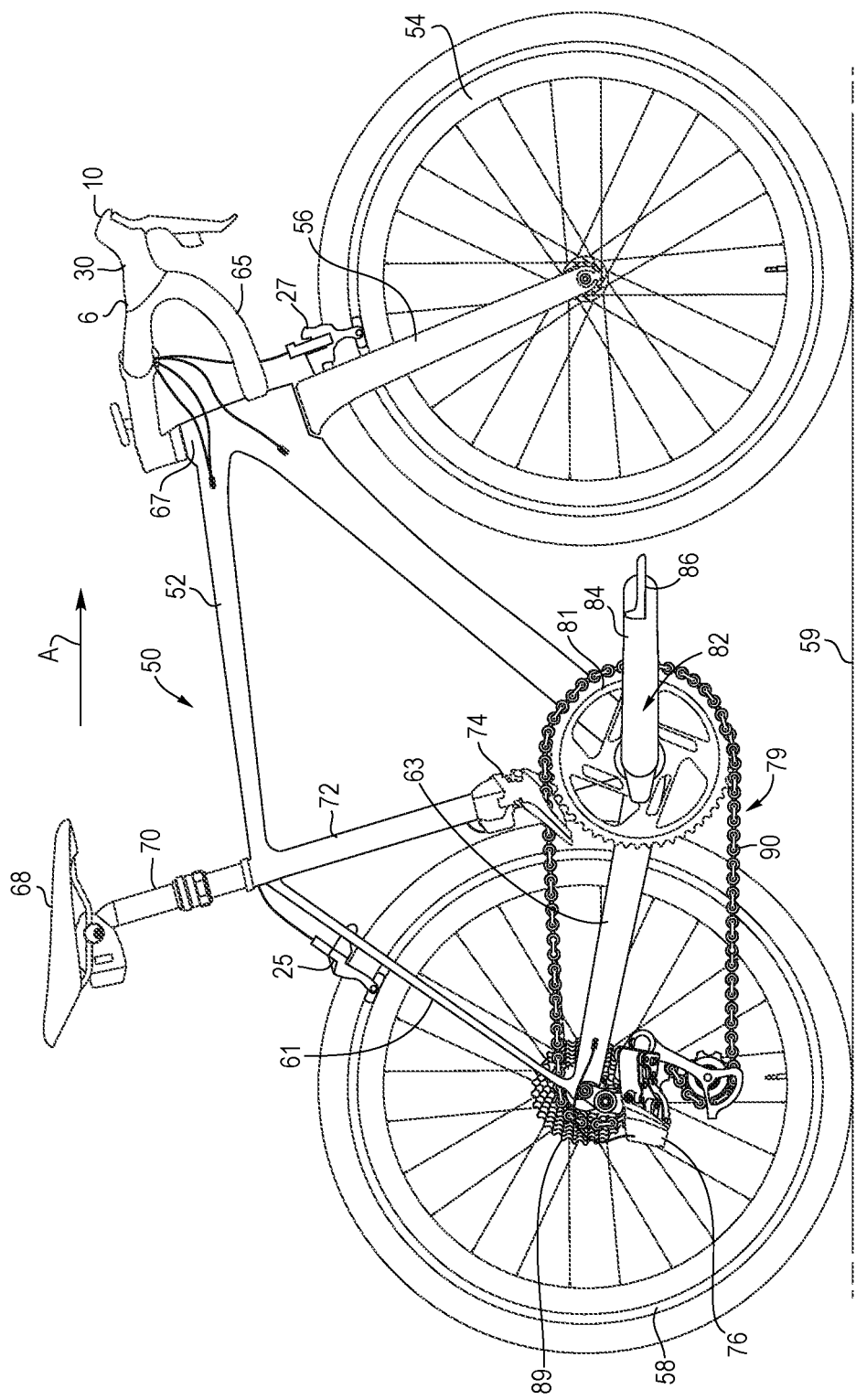
FIG. 1 is a side view of one example of a bicycle that may be fitted with a control system constructed in accordance with the teachings of this disclosure.

Bicycle:

Turning now to the drawings, FIG. 1 depicts a bicycle 50 with a frame 52, a front wheel 54 coupled to a fork 56 of the frame 52, and a rear wheel 58 coupled to seat stays 61 and chain stays 63 of the frame 52. The front wheel 54 and the rear wheel 58 support the frame 52 above a surface 59 on which the bicycle 50 may travel in a forward direction indicated by the arrow 'A'. The bicycle 50 has a handlebar 65 that is mounted to a head tube 67 of the frame 52. The bicycle 50 also has a seat 68 carried by a seat post 70 received in a seat tube 72 of the frame 52. The bicycle 50 may have one or both of a front gear changer 74 (e.g., a front electromechanical derailleur; hereinafter, referred to as a front derailleur) and a rear gear changer 76 (e.g., a rear electromechanical derailleur; hereinafter, referred to as a rear derailleur) mounted to the frame 52. The bicycle 50 includes a multiple-geared drive train 79 with one or more chainrings 81 driven by a crank assembly 82, which has two crank arms 84 and two pedals 86 in one embodiment, respectively. The chainrings 81 may be connected to and drive a plurality of sprockets 89, configured as a cassette in one embodiment, at the rear wheel 58 by a chain 90, belt or other continuous loop component.

Figure 2:
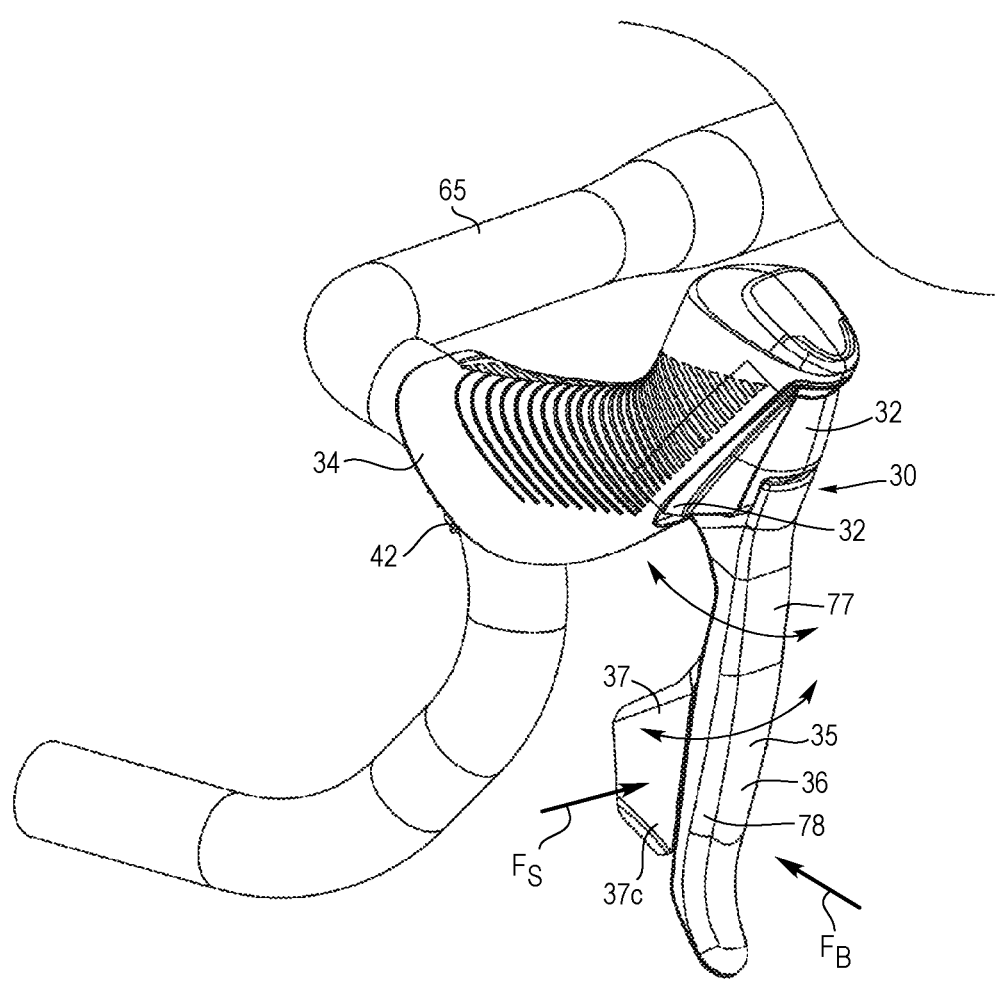
FIG. 2 is a first exterior perspective view of the control system and a portion of a handlebar of the bicycle of FIG. 1.
Figure 3:
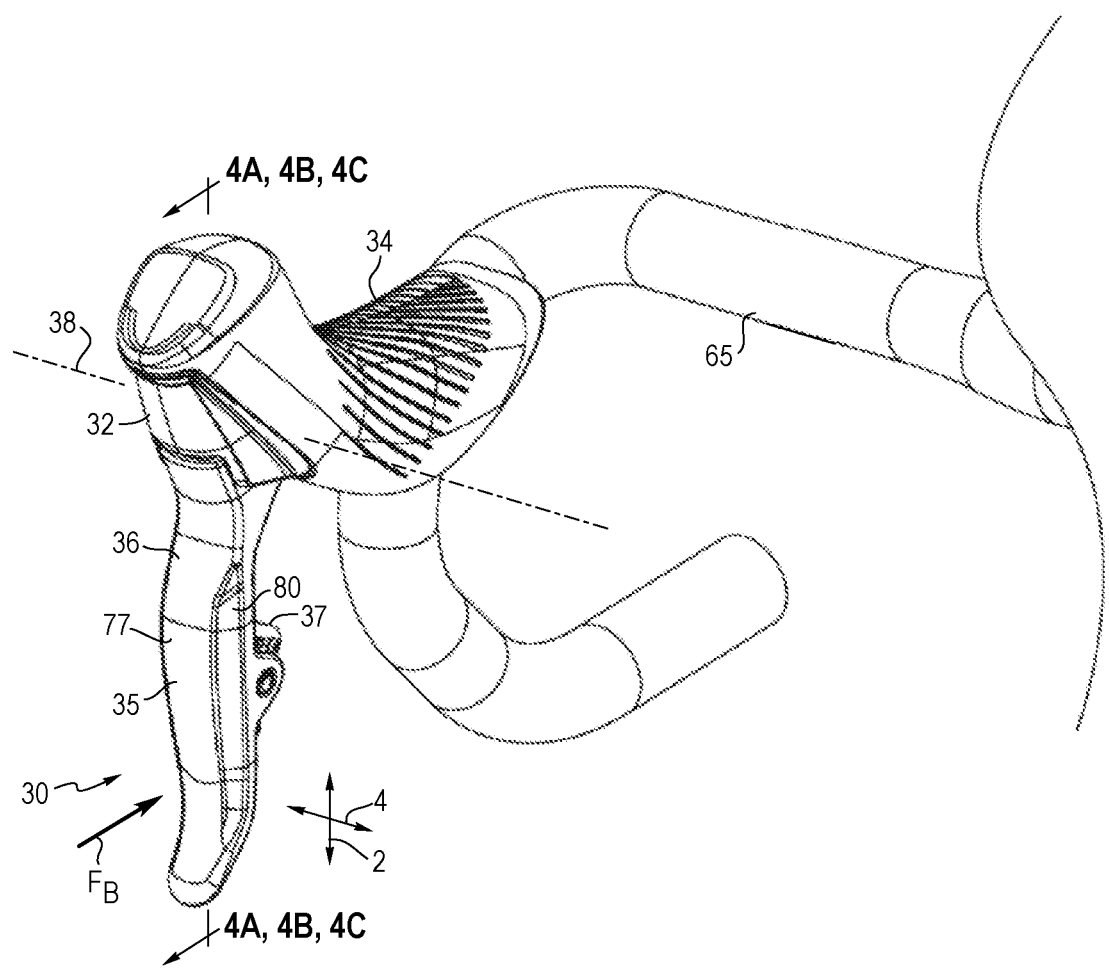
FIG. 3 is a second exterior perspective view of the control system and a portion of the handlebar of the bicycle of FIG. 1.

Control System:

FIGS. 2 and 3 are various exterior views of the bicycle control assembly 30. The control assembly 30 is mountable to the handlebar 65 with a known type of clamp 42, for example, including a band positioned about the handlebar. While shown as "drop" style handlebars, it should be understood that the control system may be mounted on other types of handlebars, including for example flat bars, bullhorn bars, riser bars and/or aero bars. Typically, a bicycle uses a pair of control assemblies 30, one for each side of the handlebar, as is well known. It will also be understood that together, the pair of assemblies may be configured to operate a pair of mechanical or electromechanical derailleurs. Similarly, the control assemblies 30 may also be configured to operate brake devices, e.g., front and rear brakes 27, 25.

Referring to FIGS. 2, 3, 11 and 12, the control assembly 30 includes a housing component 17, which may include a housing 32 in one embodiment. The housing 32 may overlie, or be covered with, a cover 34. The housing 32 is shaped and sized to be grasped by a hand of a user in one or more riding positions. The housing 32 and cover 34 serve as a grip or graspable portion, which may be gripped by the rider. The housing 32 may be of any suitable material, for example, metal, plastic and/or composite materials. The housing 32 should be constructed to carry, house and/or support various mechanisms as will be explained in detail herein. The cover 34 may be made of any suitable material, such as natural and/or synthetic elastomeric materials and may be designed to present a comfortable interface with the user and reduce the tendency to become detached or moved from its position on the housing 32. One such material is a thermoplastic elastomer (TPE) such as Santoprene™.

A brake lever 36 is movably attached to the housing 32, for example, at or near the leading or front part of the housing 32 such that the brake lever is spaced apart from the handlebar 65. In one embodiment, the brake lever 36 is pivotably coupled to the housing 32 and can pivot generally forward and backward about a pivot axis 33 in response to a force FB applied to a front face 35 of the brake lever 36. In one embodiment, the pivot axis 33 extends in the lateral direction 4. It should be understood that the force FB may be applied anywhere along the face 35 of the brake lever 36, or over an extended portion of the face, although more leverage is obtained the further the force is applied from the pivot axis 33. The brake lever 36 may be made of any suitable material such as metal, plastic or composite materials. The brake lever 36 may be attached to the housing 32 by way of a pivot 44, which may be in the form of a pivot, pin, rod or shaft, for example. In one embodiment, the brake lever 36 is considered a first operating mechanism.

As shown in FIGS. 4A-4C, 11 and 12, the housing component 17 may also include the brake lever 36, which may be entirely or partially generally U-shaped and define an interior channel 39. A shift lever assembly 38 may be positioned completely or partially within the interior of the channel 39. This channel 39 provides some rigidity to the brake lever 36 and may provide protection for components disposed within the channel, such as the shift lever assembly. In various embodiments, the shape of the brake lever 36 may receive, at least in part, the shift lever assembly 38 and may provide some further features of the invention as will be shown below.

The shift lever assembly 38 also may be movably attached to the housing 32. For example, and without limitation, the shift lever assembly 38 may be pivotally attached to the housing 32 and pivot about the pivot axis 33 during the braking operation. The shift lever assembly 38 may be positioned behind the brake lever 36, i.e., between the brake lever and the handlebar 65. The shift lever assembly 38 may be made of plastic or composite materials, for example. In the present embodiment, the shift lever assembly 38 is made, at least in part, of material that does not significantly inhibit the passage therethrough of wirelessly transmitted signals.

A brake lever pivot 44, defining the pivot axis 33, is coupled to the housing 32 and extends across an internal cavity of the housing 32. The brake lever 36 is pivotally mounted to the housing 32 on the brake lever pivot 44. The pivot 44 may be in the form of a pin or shaft, for example. The brake lever 36 may include a channel 39, which may be U-shaped in cross-section, is defined by a front or forward-oriented wall 77, defining the face 35, that extends laterally between laterally spaced outer and inner walls 78, 80.

The brake lever 36 and shift lever assembly 38 are moveably (e.g., pivotally) disposed on the laterally extending brake lever pivot 44 and are thereby moveably connected to the housing 32. In addition, the shift lever assembly 38, including the shift lever 37, is moveably connected to the brake lever 36. For example, the shift lever assembly 38 is movably disposed on a shift lever pivot 60 connected to the brake lever and defining a pivot axis 41. In one embodiment, the pivot axis 41 is non-parallel to the pivot axis 33. In an embodiment, the pivot axis 41 may be substantially perpendicular to the pivot axis 33. In one embodiment, the pivot axis 33 and the pivot axis 41 are within about ±25 degrees of perpendicular, while in other embodiments the axes are within ±10 degrees of perpendicular, and in one embodiment the axes are orthogonal. During braking operations, wherein the force FB is applied to the brake lever 36, the brake lever 36 is moveable relative to the housing 32 between an at-rest position and a brake engaging position, wherein the brakes 27, 25 are actuated to engage one or both of the wheels 54, 58. In one embodiment shown, the brake lever 36 is moveably connected to the housing 32 by pivoting the brake lever 36, but it should be understood in other embodiments, the brake lever 36 may be moveable relative to the housing 32 by way of translation, or a combination of translation and pivoting.

Figure 11:
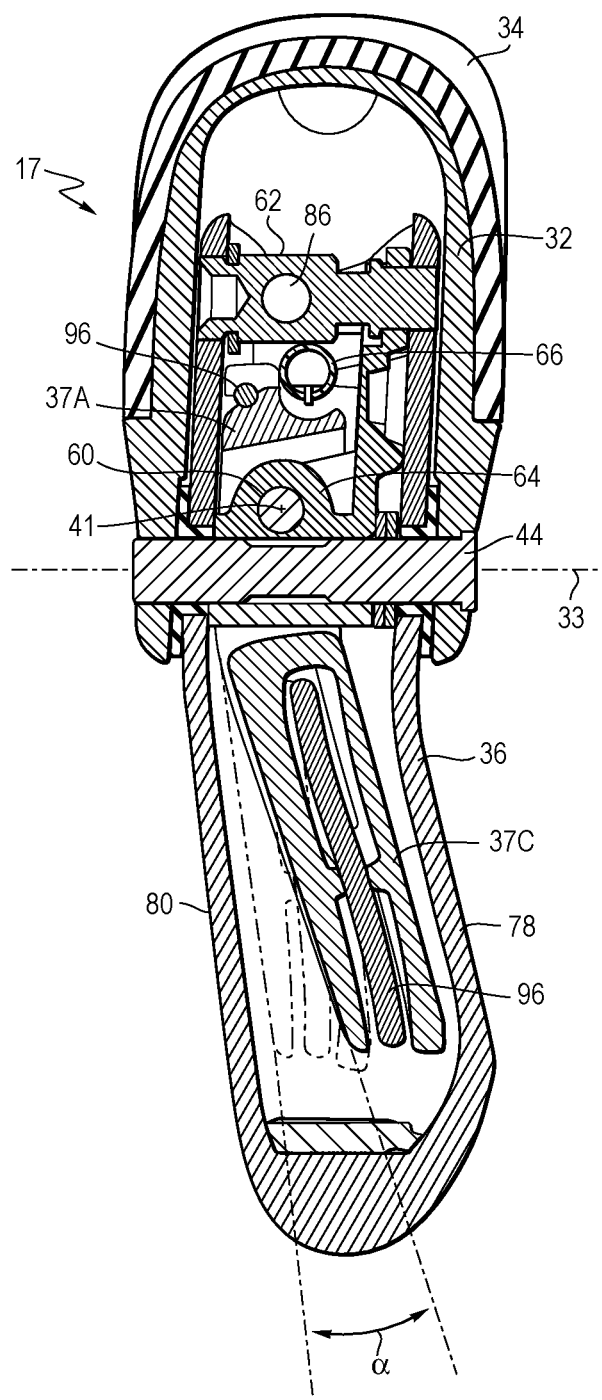
FIG. 11 is a cross-sectional view of the control system.
Figure 12:
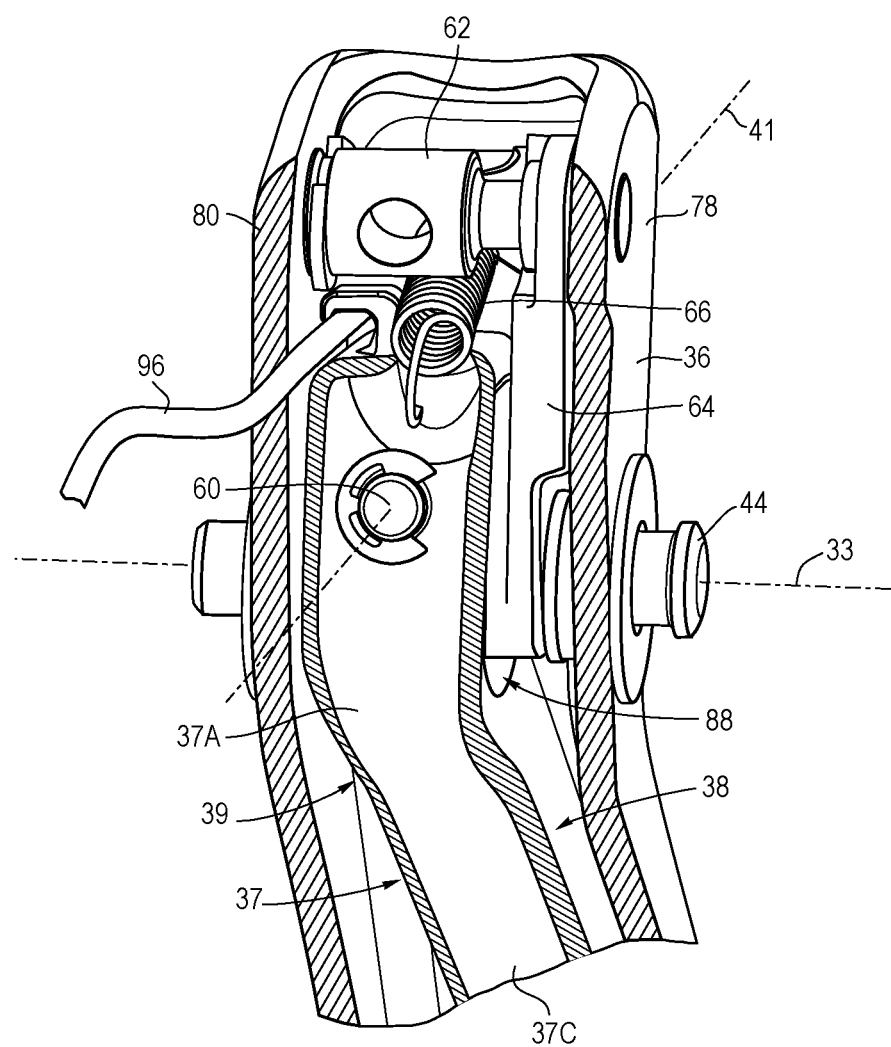
FIG. 12 is a partial rear view of the control system.
Figure 13:
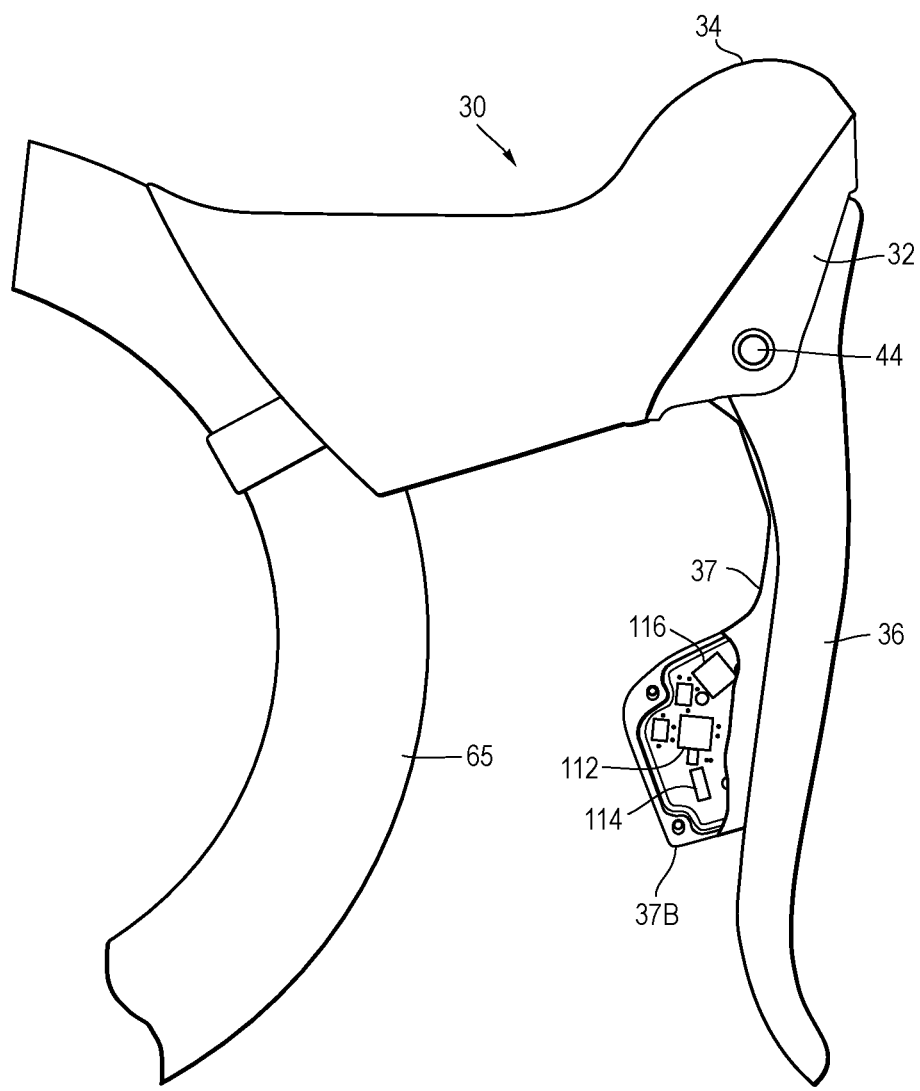
FIG. 13 is a cutaway side view of the control system.
Figure 14:
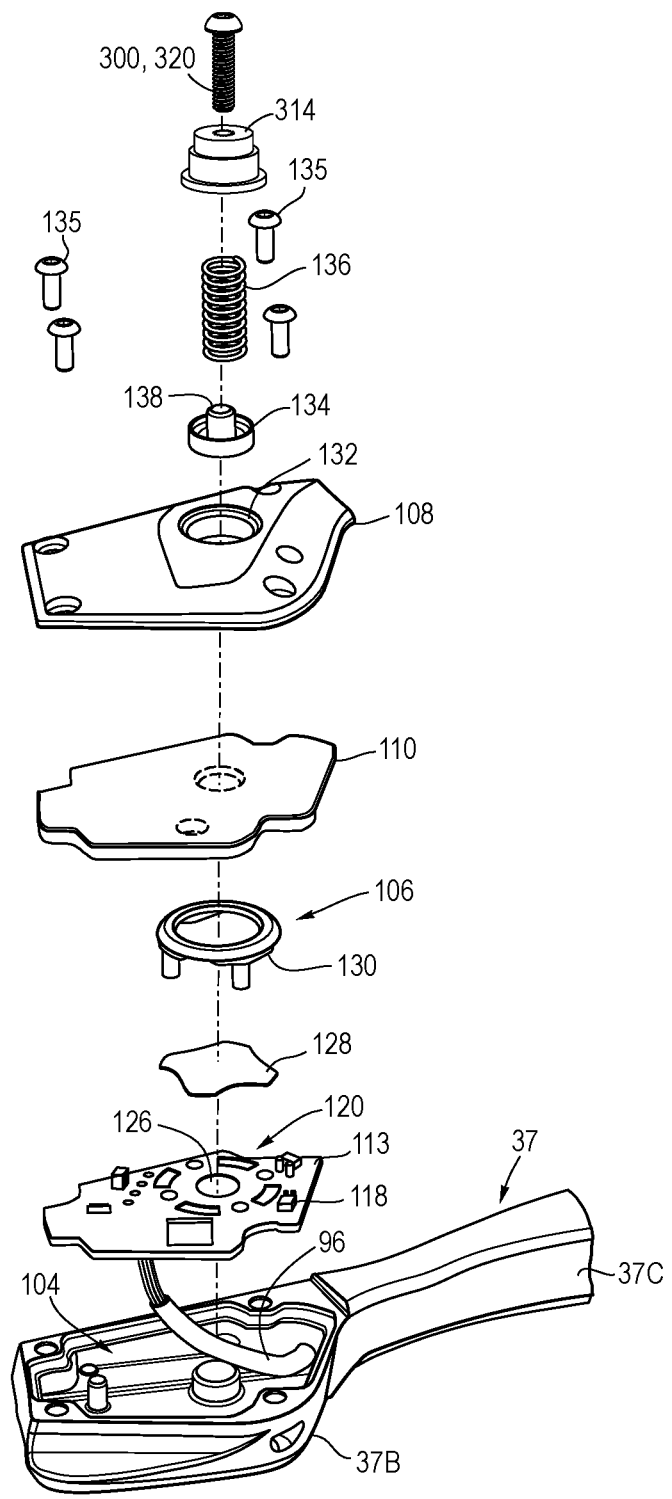
FIG. 14 is an exploded perspective view of a portion of a shift lever assembly with electronic components.

Likewise, the shift lever assembly 38, including a shift lever 37, is moveably connected to the brake lever 36. In one embodiment, the shift lever 37 is moveable relative to the brake lever 36 a distance between an at-rest position and a shift actuating position, wherein a shifting of the front and/or rear gear changers 74, 76 occurs. The shift lever 37 may be moveably connected to the brake lever 36 by pivoting the shift lever 37, but it should be understood in other embodiments the shift lever may be moveable relative to the brake lever by way of translation, or a combination of translation and pivoting or any other motion. It should be understood that the distance between the at-rest position and the shift actuating position may be measured as an angular distance α as shown in FIG. 11, or as a distance that a particular point or component of the shift lever travels as the shift lever moves between the rest position and the shift actuating position. The distance may vary depending on the location of the point/component on the shift lever and the distance from the pivot axis. For example, the shift lever 37 pivots about axis 41 through an angle α between the at-rest position and the shift-actuating position. At the same time, a discrete point (e.g., an end 322 of post 320) on the shift lever 37 travels a lateral distance (D) as the shift lever moves, for example D=D1, D2 or D3 as shown in FIGS. 4A-4C, depending on the position of an adjustable shift actuator 300.

The orientation of the shift lever pivot 60 permits the shift lever assembly 38 to move in a direction that is substantially aligned with the axis 33 of the brake lever pivot 44. In other words, the shift lever assembly 38 is mounted to move laterally inwardly and outwardly, (i.e., inboard and outboard) for example, toward the inner wall 80 from a rest position adjacent the outer wall 78 of the brake lever 36 to a shift actuating position closer to the inner wall 80, as shown in FIG. 11, and vice versa.

The shift lever assembly 38 includes the shift lever 37, which has a proximal end 37A directly or indirectly pivotally attached to the housing 32, a distal or paddle end 37B opposite the proximal end (see, e.g., FIG. 11) and an elongate arm 37C connecting the proximal and distal ends. The arm 37C may be U-shaped and define an interior cavity or internal compartment 104.

The shift lever assembly 38 may also have an opening 88 that is located to accommodate the passage therethrough of the brake lever pivot 44 and permit the shift lever assembly to be moved about the shift lever pivot 60 without interference from the brake lever pivot 44.

A shift pivot bracket 64 has a portion that is arranged about the brake lever pivot 44 and resides in part in the opening 88 of the shift lever assembly 38. The shift pivot bracket 64 extends away from the brake lever pivot 44 to receive the shift lever pivot 60. The shift pivot bracket 64 may extend upwardly from the area of the brake lever pivot 44 to connect to a brake cable head holder 62. The shift pivot bracket 64 connects the brake lever pivot 44 to the brake cable head holder 62 to cause the shift lever assembly 38 to move with the brake lever 36 in the fore and aft direction when the brake lever 36 is actuated, while permitting the shift lever assembly 38 move laterally relative to the brake lever 36, thereby providing for a shift operation independent from a brake operation.

A return spring 66 may connect directly or indirectly to housing 32 to bias the brake lever 36 to a rest position. The return spring 66 biases the brake lever 36 and shift lever assembly 38 into the at-rest position when the force FB is relieved.

Referring to FIGS. 4A-C, 13 and 14, electronic componentry 106 for operation of the control assembly 30 is shown. The electronic componentry 106 may be housed within the distal end 37B of the shift lever 37, and may be configured as an electronic module having a module housing, defining a compartment 104, coupled to the one of the brake lever or the shift lever, wherein the module housing encloses the switch 120 and includes a seal 110 separating the switch 120 and a shift actuator 300. In alternative embodiments, some of the electronic componentry 106 may be housed on and/or within the brake lever 36, which may or may not include a module housing, as shown for example in FIG. 10, and/or on and/or within the housing 32.

The distal end 37B may be a widened part of the shift lever 37 to provide convenient and secure interaction with a user. The distal end 37B has one or more internal compartments 104, defined for example by the module housing, for housing the electronic componentry 106. The internal compartment 104 is closed by a compartment cover 108. To exclude water and other contaminants from entry into the internal compartment 104, the seal 110 may be interposed between the compartment 104 and the cover 108. The seal 110 may be a rubber seal member or any suitable material that satisfactorily seals the compartment from contaminants. In one example, the seal 110 is transparent or includes an area of the seal material that permits light to pass through from a LED component 118, or the like, of the electronic componentry 106 disposed in the compartment.

In one embodiment, the cable 96 is electrically connected to the electronic componentry 106 and extends along the interior of the shift lever arm 37C from the housing 32. The cable 96 may electrically connect a power supply, e.g., a battery (not shown), positioned in the housing 32 and optional accessory connections with the electronic componentry 106.

The electronic componentry 106 may be mounted upon or connected to a printed circuit board ("PCB") or the like. The PCB 113 may include a communication module 112 to generate and transmit signals for wireless transmission in the form of electromagnetic radiation (EMR), e.g., radio waves. Optionally, the communication module 112 may also receive signals, which may be in the form of EMR. The communications module 112 includes or is a transmitter or a transceiver, for example.

The PCB 113 may include an antenna 114 in operative connection with the communication module 112 to send and optionally also receive EMR. The antenna 114 is any device designed to transmit and/or receive electromagnetic (e.g. TV or radio) waves.

In one embodiment, the antenna 114 is located in a position on part of the control assembly 30 where it will be able to send signals without significant interference from the structure of the assembly and/or from a user's hand. Therefore, in one embodiment, the antenna 114 positioned, at least in part, in a portion of the control assembly 30 that is separate or remote or spaced from the housing 32. The position of the antenna 114 may be on or in the brake lever 36 or shift lever 37, for example.

The control assembly 30 includes a controller 116, which may be positioned on the PCB 113. The controller 116 is operatively connected to the communication module 112 to perform electronic operations related to one or more of shifting, pairing, derailleur trim operations, power management and so on.

An example of a controller 116, suitable and configurable for the objectives set out herein, is an Atmel ATmega324PA microcontroller with an internal eeprom memory. An example of a communication module 112, suitable and configurable for the objectives set out herein, is an Atmel AT86RF231 2.4 GHz transceiver utilizing AES encryption and DSS spread spectrum technology supporting 16 channels and the IEEE 802.15.4 communication protocol. Other suitable controllers 116 and communications modules 112 are contemplated. Also, ancillary electrical and/or electronic devices may be used as is well known in the art, to enable the functioning of the controller 116 and communications module 112 and related components.

The control assembly 30 may include one or more LEDs 118, which may be positioned on the PCB 113. The LED 118 conveys status of the electronic componentry 106 and one or more electrical switches 120. Light emitted by the LED 118 may be viewable, for example, through the seal 110 and an opening or non-opaque area that is provided in the cover 108.

The electrical switch 120, when actuated, may cause operations to be carried out by the controller 116. The operations carried out by the controller 116 may be related to communication, derailleur pairing, trim and/or shift operations, for example, and may generate signals to initiate or elicit an action and/or response from various mechanisms of a bicycle such as the gear shifting devices 74, 76.

The electrical switch 120 includes a contact 126, which may be disposed on the PCB 113, an electrical dome switch element 128, or the like, positioned to contact the contact when depressed and a retainer 130 connected to the PCB to maintain alignment of the electrical dome switch element 128 with the contact. It should be understood that other types of electrical switches may also be suitable. The electrical switch 120 may be used for an operation of the control assembly 30 that will be performed more frequently and potentially forcefully, such as the initiation of a shift operation.

In the example shown herein, the electronic componentry 106 is disposed on the PCB 113, which is positioned and fixed in place in the internal compartment 104. The seal 110 overlies the PCB 113 and seals the internal compartment 104 of the distal end 37B beneath the cover 108 when the cover is affixed to the shift lever distal end, for example with fasteners 135, or with a snap fit, tabs, adhesive or other connectors. In this example, the electrical switch 120 may be actuated through the seal 110 from the outside thereof. The cover 108 includes one or more openings 132 that receive and house a portion of a shift actuator 300, for example a button actuator 134 disposed therein. The button actuator 134 operates through the material of the seal 110. In this manner, the integrity of the seal 110 is not compromised. Also, biasing member 136, shown as an actuator spring, may be provided to provide a biasing force to the actuator button 134. The actuator spring may be held on the actuator 134 by a projection 138 that may be sized and shaped to retain the spring in alignment and/or engagement with the actuator. It should be understood that the biasing member, while shown as a compression spring, may be configured as a tension spring, leaf spring, magnetic component or other component configured to move two parts toward and/or away from each other. In one embodiment, when the biasing member 136 is sufficiently compressed, it urges the actuator 134 toward the seal 110 and electrical dome switch element 128, causing the dome switch element to close with and actuate the electrical switch 120.

Figure 10:
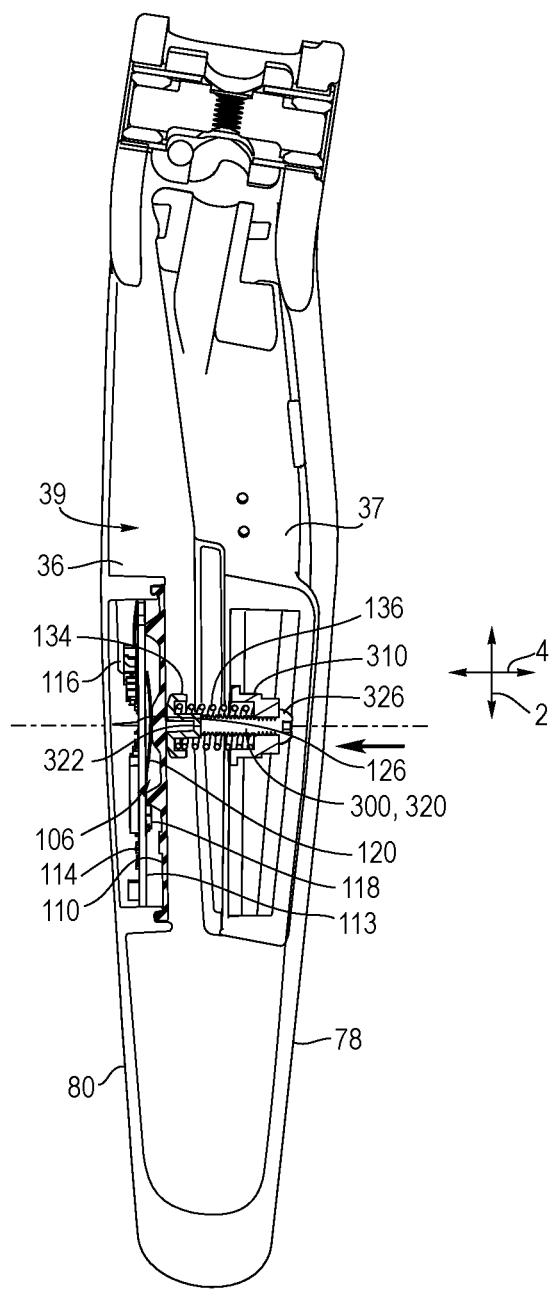
FIG. 10 is a cross-sectional view of an alternative embodiment of a bicycle control system.

In an alternative embodiment, shown in FIG. 10, the electronic componentry 106, including the PCB 113, seal 110, cover 108, and switch 120, may be housed in the brake lever 36, for example in the channel 39, or on the inner wall 80. In other embodiments, the electronic componentry 106, including the switch, may be housed in or on the housing 32.

Referring to FIGS. 4A-10, the shift actuator 300 may be configured as an adjustable shift actuator, which is moveably coupled the brake lever 36, for example on the wall 80. In an alternative embodiment, shown in FIG. 10, the adjustable shift actuator 300 is moveably coupled to the shift lever 37. In either embodiment, the shift actuator 300 is configured to actuate the electrical switch 120 when the shift lever is moved from the at-rest position to the shift actuating position. The shift actuator 300 is adjustably moveable relative to the other of the brake lever 36 or the shift lever 37 so as to adjust the distance between the at-rest position and the shift actuating position, as shown for example in FIGS. 4A-4C. For example, the shift actuator 300 may be adjusted between various shift stroke positions. These various positions may include a minimum shift stroke position shown in FIG. 4A, an intermediate shift stroke position shown in FIG. 4B and a maximum shift stroke position shown in FIG. 4C. The shift actuator 300 is infinitely adjustable between the minimum and maximum shift stroke positions.

As shown in FIGS. 4A-10, the shift actuator 300 is axially moveable relative to the other of the brake lever or the shift lever along an axis 321, defined for example by a moveable post 320. Put another way, the shift actuator 300 may be extended or retracted toward and away from the shift lever 37 or brake lever 36. In one embodiment, the post 320 may be threadably engaged with the other of the brake lever 36 (FIGS. 4A-D) or the shift lever 37 (FIG. 10). For example, a grommet, or holder 310, may be mounted in an opening 312 of the shift lever 37 or brake lever 36. The holder 310 has an annular hub 314 fitting in the opening, an annular inner flange 316 that prevents the holder 310 from being pulled out of the opening 312 and an outer annular hub 318. A through opening 324 extends through the inner and outer hubs 314, 318, and may be threaded, with the shift actuator 300, or post 320 portion thereof, threadably engaged with the opening 324. It should be understood that the shift lever 37 or brake lever 36 may have a threaded opening formed directly therein, with the post engaged with the opening and the holder omitted.

The post 320 may be configured as a screw, with an end 326 defining a user interface opposite the first end 322. The end 326 may be engaged by a user to adjust the position of the shift actuator. The user interface, or end 326, may be configured as a head, which may be knurled or include a tool interface, for example a Phillips head pattern, square head, slot, etc., that may be engaged by a tool, such as a driver including for example a screw driver. In other embodiments, the shift actuator, e.g., post 320, may be translated relative to the holder without rotation, for example by a pneumatic, hydraulic or servo drive.

In one embodiment, the holder 310 is further configured as a spring retainer, with an interior cavity 330 defined by the hub and flange. An end 137 of the spring 136 may be disposed in the cavity 330, with an opposite end 139 of the spring coupled to the button actuator 134.

The end of the shift actuator 300, or the end portion 322 of the post 320 is configured to actuate the switch 120, whether engaged directly with the seal 110 or through the actuator button 134. The biasing member 136, which may be configured as a spring, biases the shift lever 37 to the at-rest position. In one embodiment, the holder 310 is configured as a first retainer engaged with the first end 137 of the biasing member 136 and the actuator button 134 is configured as a second retainer engaged with the second end 139 of the biasing member 136 opposite the first end 137. The shift actuator 300, for example the post 320, is moveably coupled to the first retainer, or the holder 310. As the shift lever 37 is pivoted about the axis 41, and the end portion 322 of the post engages the second retainer, or actuator button 134, the shift actuator 300 is moved to the shift actuating position and actuates the switch 120.

As shown in FIGS. 4A-C, the shift actuator 300 is adjustable, for example along the axis 321. In other embodiments, the shift actuator 300 may be adjusted in a non-axial manner, for example by way of a cam. In any event, the spacing between the end 322 of the shift actuator, e.g. post, in the at-rest position and the switch 120, or component such as the actuator button 134 and seal 110 engaging the switch, may be varied. For example, the shift actuator 300 has a maximum extension toward the switch 120, or minimum distance D1 between the switch 120 (taking into account the stack up of the actuator button and seal) and the end of the shift actuator 300. Accordingly, as the shift lever 36 is moved by applying a lateral shifting force $F_s$, the shift lever 36 moves only the distance D1 before reaching the shift actuating position where the end portion 322 indirectly engages the switch 120, by way of the actuation button 134 and seal 110. In an embodiment, the shift stroke is adjustable. Specifically, in an example, the shift stroke may be between 0-6 mm. In an alternate example, the shift stroke may be between 3-6 mm. In one embodiment, $D_1$ may be between 0-6 mm. In another embodiment, $D_1$ may be 5.5 mm. In another embodiment, $D_1$ may be 2-3 mm, or as little as 1.5 mm.

It should be understood that the actuation button 134 and seal 110 may be omitted, with the shift actuator 300 directly engaging the switch 120. It also should be understood that a minimum angular distance (a) between at-rest position and shift actuation position is associated with this position of the shift actuator 300 as shown in FIG. 4A. In this way, the control is configured with the smallest possible shift stroke, which corresponds to the smallest shift time, or fastest shift speed.

As the shift actuator is moved, or adjusted, the spacing between the end 322 of the shift actuator 300, e.g. post 320, in the at-rest position and the switch, or component such as the actuator button 134 and seal 110 engaging the switch 120, may be increased. For example, as shown in FIG. 4B, the shift actuator 300 has an intermediate extension as directed toward the switch 120, or intermediate distance $D_2$ of travel between the switch 120 (taking into account the stack up of the actuator button and seal) and the end 322 of the shift actuator. Accordingly, as the shift lever is moved by applying a lateral force $F_s$, the shift lever 36 moves only the distance $D_2$ before reaching the shift actuating position. In this position, due to the greater distance, both angular (a) and as measured by the travel of the shift actuator 300 at a particular location, the shift time is increased and shift speed is decreased.

As shown in FIG. 4C, the shift actuator 300 has minimum extension as directed toward the switch 120, or maximum distance $D_3$ of travel between the switch (taking into account the stack up of the actuator button and seal) and the end 322 of the shift actuator. Accordingly, as the shift lever 36 is moved by applying a lateral shift force $F_s$, the shift lever 36 moves the distance $D_3$, corresponding to a maximum angular distance α, before reaching the shift actuating position, which corresponds to a maximum or longest shift time and slower speed.

It should be understood that the biasing member may be offset from the shift actuator in some embodiments, rather than being aligned with and surrounding the shift actuator or extending along the axis 321.

The various embodiments of the bicycle control system provide significant advantages over other bicycle control systems. For example, and without limitation, the adjustability of the shift actuator allows the rider, or other user such as mechanic, to adjust the shift stroke. This feature may be particularly suitable for a control system having a separate brake lever and shift lever that are pivotable together during braking, but where the shift lever pivots separately during shifting. In this way, the rider can individualize the shift stroke so as to ensure a successful/purposeful shift, and reduce the possibility that the rider will have trouble fully actuating the shift lever. The adjustable stroke length allows a user to customize their shift stroke preference, may aid in reduction of shift time/speed if deemed a priority, and/or tailor the ergonomics of the shift lever to the rider's preference. For example, the different stroke length may provide a helpful ergonomic adjustment for the varying hand sizes of riders. The adjustable shift actuator is compact and does not noticeably increase the overall size or weight of the control system. At the same time, the actuator is readily accessible from an exterior of the control system in one embodiment, thereby permitting quick and easy adjustment of the shift actuator.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

Although embodiments have been described for illustrative purposes, those skilled in the art will appreciate that various modifications, additions, and substitutions are possible, without departing from the scope and spirit of the disclosure. It is therefore intended that the foregoing description be regarded as illustrative rather than limiting, and that it be understood that all equivalents and/or combinations of embodiments and examples are intended to be included in this description.

Although certain parts, components, features, and methods of operation and use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A bicycle control system comprising:
   a housing;
   a brake lever moveably connected to the housing, wherein the brake lever is moveable relative to the housing between an at-rest position and a brake engaging position;
   a shift lever, wherein the shift lever is moveable relative to the brake lever a distance between an at-rest position and a shift actuating position;
   an electrical switch disposed on one of the brake lever or the shift lever; and
   an adjustable shift actuator moveably coupled to the other of the brake lever or the shift lever, wherein the shift actuator is configured to actuate the electrical switch when the shift lever is moved to the shift actuating position, and wherein the adjustable shift actuator is configured to be adjustably moveable relative to the other of the brake lever or the shift lever so as to adjust the distance between the at-rest position and the shift actuating position.

2. The bicycle control system of claim 1 wherein the brake lever is pivotally connected to the housing, wherein the brake lever is pivotable relative to the housing about a first pivot axis between the at-rest position and the brake engaging position.

3. The bicycle control system of claim 2 wherein the shift lever is pivotally connected to the brake lever, wherein the shift lever is pivotable relative to the brake lever about a second pivot axis between the at-rest position and the shift actuating position, wherein the first pivot axis and the second pivot axis are non-parallel, and wherein the distance comprises an angular distance.

4. The bicycle control system of claim 1 further comprising a controller disposed on the one of the brake lever or the shift lever, wherein the controller is in communication with the electrical switch and configured to generate a signal to change a shift position of a gear shifting device responsive to an input from the electrical switch.

5. The bicycle control system of claim 4 further comprising a printed circuit board ("PCB") disposed on the one of the brake lever or the shift lever, a communications module in communication with the controller and an antenna in communication with the controller and configured to send the signal.

6. The bicycle control system of claim 1 further comprising an electronic module comprising a module housing coupled to the one of the brake lever or the shift lever, wherein the module housing encloses a switch, and wherein the electronic module comprises a seal separating the switch and the shift actuator.

7. The bicycle control system of claim 1 wherein the shift actuator defines an axis, wherein the shift actuator is axially moveable relative to the other of the brake lever or the shift lever.

8. The bicycle control system of claim 7 wherein the shift actuator is threadably engaged with the other of the brake lever or the shift lever.

9. The bicycle control system of claim 8 wherein the other of the brake lever or the shift lever comprises a retainer, wherein the shift actuator is threadably engaged with the retainer, and wherein the shift actuator comprises an end portion configured to actuate the switch.

10. The bicycle control system of claim 1 further comprising a biasing member disposed between the shift lever and the brake lever, wherein the biasing member biases the shift lever to the at-rest position.

11. The bicycle control system of claim 10 wherein the biasing member comprises a spring.

12. The bicycle control system of claim 11 wherein the other of the brake lever or the shift lever comprises a first retainer engaged with a first end of the spring and a second retainer engaged with a second end of the spring opposite the first end, wherein the shift actuator is moveably coupled to the first retainer, and wherein the shift actuator comprises an end portion engageable with the second retainer as the shift actuator is moved to the shift actuating position.

13. A bicycle control system comprising:
a housing component;
a shift lever moveably connected to the housing component, wherein the shift lever is moveable relative to the housing component a distance between an at-rest position and a shift actuating position, wherein the shift lever comprises an electrical switch and a controller, wherein the controller is in communication with the electrical switch and is configured to generate a signal to change a shift position of a gear shifting device responsive to an input from the electrical switch; and
an adjustable shift actuator moveably coupled to the housing component, wherein the shift actuator is configured to actuate the electrical switch when the shift lever is moved to the shift actuating position, and wherein the adjustable shift actuator is configured to be adjustably moveable relative to the housing component so as to adjust the distance between the at-rest position and the shift actuating position.

14. The bicycle control system of claim 13 wherein the housing component comprises a housing and a brake lever moveably connected to the housing, wherein the brake lever is moveable relative to the housing between an at-rest position and a brake engaging position, and wherein the adjustable shift actuator is moveably coupled to the brake lever.

15. The bicycle control system of claim 14 wherein the brake lever is pivotally connected to the housing, wherein the brake lever is pivotable relative to the housing about a first pivot axis between the at-rest position and the brake engaging position.

16. The bicycle control system of claim 15 wherein the shift lever is pivotally connected to the brake lever, wherein the shift lever is pivotable relative to the brake lever about a second pivot axis between the at-rest position and the shift actuating position, wherein the first pivot axis and the second pivot axis are non-parallel, and wherein the distance comprises an angular distance.

17. The bicycle control system of claim 16 wherein the shift actuator defines an axis, wherein the shift actuator is axially moveable relative to the brake lever.

18. The bicycle control system of claim 17 wherein the shift actuator is threadably engaged with brake lever.

19. The bicycle control system of claim 17 further comprising a spring disposed between the shift lever and the brake lever, wherein the spring biases the shift lever to the at-rest position.

20. The bicycle control system of claim 19 wherein the brake lever comprises a first retainer engaged with a first end of the spring and further comprising a second retainer engaged with a second end of the spring opposite the first end, wherein the shift actuator is moveably coupled to the first retainer, and wherein the shift actuator comprises an end portion engageable with the second retainer as the shift actuator is moved to the shift actuating position.

21. The bicycle control system of claim 1, wherein the shift actuator includes a screw.

* * * * *